M. POWE.
Fifth Wheel for Vehicles.

No. 202,190.          Patented April 9, 1878.

WITNESSES:
C. Neveux
C. Sedgwick

INVENTOR:
M. Powe
BY Munn & Co
ATTORNEYS.

UNITED STATES PATENT OFFICE.

MOSES POWE, OF PHILLIPSBURG, NEW JERSEY, ASSIGNOR TO HIMSELF AND JOHN BITTERS, OF EASTON, PENNSYLVANIA.

IMPROVEMENT IN FIFTH-WHEELS FOR VEHICLES.

Specification forming part of Letters Patent No. 202,190, dated April 9, 1878; application filed March 16, 1878.

*To all whom it may concern:*

Figure 1:
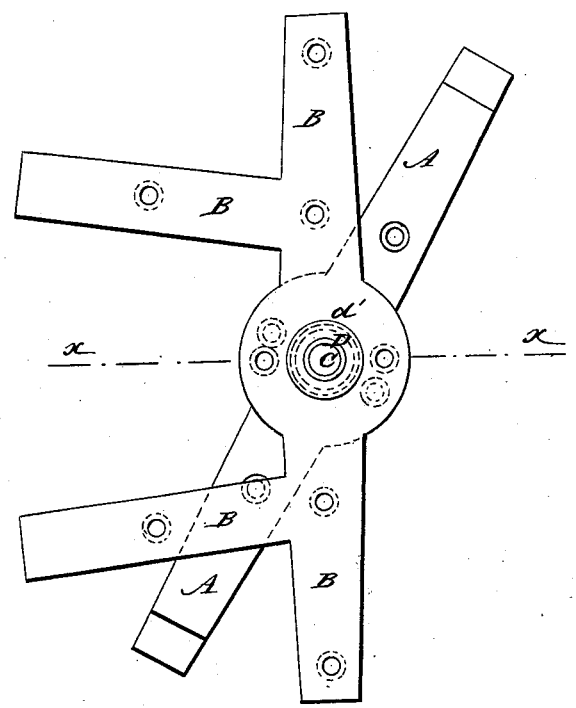
Figure 2:
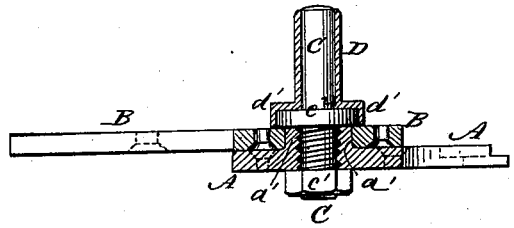

Be it known that I, MOSES POWE, of Phillipsburg, in the county of Warren and State of New Jersey, have invented a new and useful Improvement in Fifth-Wheels for Vehicles, of which the following is a specification:

Figure 1 is a top view of my improved fifth-wheel. Fig. 2 is a detail section of the same, taken through the line $x\ x$, Fig. 1.

Similar letters of reference indicate corresponding parts.

The object of this invention is to furnish an improved fifth-wheel for vehicles which shall be simple in construction, light, strong, and durable, and not liable to get out of order.

The invention consists in the king-bolt, having a screw-thread cut upon its lower part, and provided with the jam-nut and the collar, the collar formed upon the enlarged center of the lower bar, having a screw-thread cut in its inner surface, and fitting into a hole in the enlarged center of the upper bar, and the sleeve, having its lower end enlarged to fit upon the collar of the king-bolt, in combination with each other and with the two bars, as hereinafter fully described.

A represents a bar connected with the axle, and B represents a bar connected with the vehicle-body. The middle parts of the bars A are enlarged into circular form to give them a wide bearing upon each other. Upon the upper side of the center of the bar A is formed a collar, $a'$, through which and the said bar A is cut a screw-thread, to receive the screw-thread cut upon the lower part of the king-bolt C. Upon the lower end of the king-bolt C is screwed a nut, $c^1$, which is turned up against the lower side of the bar A, and serves as a jam-nut, to prevent the said king-bolt from working loose. The bar A and the king-bolt C thus turn together. Through the center of the bar B is formed a hole to receive and fit upon the collar $a'$ of the bar A, the said collar being made of such a height that its upper end may be flush with the upper side of the bar B. Upon the king-bolt C, at the upper side of the bar B, is formed a collar, $c^2$, of such a size as to pass beyond the collar $a'$ and overlap the upper side of the bar B, so as to keep the said bar B in place. The upper end of the king-bolt C is kept from wearing the timber in which it works by the sleeve D, which fits upon the said upper part of the king-bolt C, and is fitted into a hole in the said timber.

The lower end of the sleeve D has an enlargement, $d'$, formed upon it, to receive and fit upon the collar $c^2$ of the king-bolt C. The collar $c^2$ and the enlargement $d'$ thus sustain the weight and take the most of the wear.

By this construction the forward end of the vehicle-body will be firmly supported, whatever be the position of the forward wheels of the vehicle, and at the same time the vehicle may be cramped easily.

Having thus described my invention, I claim as new and desire to secure by Letters Patent—

The king-bolt C, having a screw-thread cut upon its lower part, and provided with the jam-nut $c^1$ and the collar $c^2$, the collar $a'$, formed upon the enlarged center of the bar A, having a screw-thread cut in its inner surface, and fitting into a hole in the enlarged center of the bar B, and the sleeve D, having its lower end enlarged to fit upon the collar $c^2$, in combination with the said bars A B, substantially as herein shown and described.

MOSES POWE.

Witnesses:
   WM. C. EDELMAN,
   JOHN S. NOBLE.